US006600517B1

United States Patent
He et al.

(10) Patent No.: US 6,600,517 B1
(45) Date of Patent: Jul. 29, 2003

(54) SYSTEM AND METHOD FOR IMPROVING THE SHARPNESS OF A VIDEO IMAGE

(75) Inventors: Haiyan He, Wappingers Falls, NY (US); Johan Gerard Janssen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 332 days.

(21) Appl. No.: 09/639,147

(22) Filed: Aug. 16, 2000

Related U.S. Application Data (60) Provisional application No. 60/187,422, filed on Mar. 7, 2000.

(51) Int. Cl.⁷ .............................................. H04N 5/21
(52) U.S. Cl. ...................... 348/625; 348/606; 348/627; 348/631; 382/266
(58) Field of Search ................................. 348/625, 606, 348/631, 627; 382/263, 266, 269; H04N 5/21, 5/217

(56) References Cited

U.S. PATENT DOCUMENTS

| | | | | |
|---|---|---|---|---|
| 5,872,605 A | * | 2/1999 | Nonaka et al. | 348/625 |
| 6,072,539 A | * | 6/2000 | Harlos et al. | 348/625 |
| 6,094,205 A | * | 7/2000 | Jaspers | 348/625 |
| 6,181,385 B1 | * | 1/2001 | Correa | 348/625 |
| 6,278,494 B1 | * | 8/2001 | Kanai et al. | 348/625 |

FOREIGN PATENT DOCUMENTS

| | | |
|---|---|---|
| EP | 0478024 B1 | 2/1996 |
| EP | 0881827 A2 | 12/1998 |
| EP | 0818932 B1 | 11/1999 |
| WO | 9724882 A2 | 7/1997 |
| WO | 9811732 A1 | 3/1998 |

OTHER PUBLICATIONS

US 000010, Method and Apparatus for Edge Detection, Filed Concurrently.
US 000182, Method and Apparatus for Improving Conversion From SD to HDTV, Filed Concurrently.

\* cited by examiner

*Primary Examiner*—Michael H. Lee
*Assistant Examiner*—Trang U. Tran
(74) *Attorney, Agent, or Firm*—Laurie E. Gathman (57) ABSTRACT

There is disclosed an apparatus for sharpening an edge in a video image. The apparatus comprises: 1) a first circuit for determining a first luminance value of a first pixel associated with the first edge and a second luminance value of a second pixel associated with the first edge, wherein the first and second pixels are adjacent pixels; 2) a second circuit for determining a position of a first subpixel disposed between the first and second pixels, wherein the first subpixel position is disposed approximately at a center of the first edge; 3) a third circuit for increasing a luminance value of a second subpixel disposed on a first side of the first edge center; and 4) a fourth circuit for decreasing a luminance value of a third subpixel disposed on a second side.of the first edge center opposite the first side.

24 Claims, 5 Drawing Sheets

SYSTEM AND METHOD FOR IMPROVING THE SHARPNESS OF A VIDEO IMAGE

This application claims priority under 35 U.S.C. §119(e) to U.S. Provisional Patent Application No. 60/187,422 entitled "Subpixel-Level Luminance Transient Improvement for Video Signal" filed Mar. 7, 2000.

TECHNICAL FIELD OF THE INVENTION

The present invention is directed to an apparatus and method for enhancing a video signal and, more specifically, to an apparatus and method for improving the sharpness of a video image by making edge transitions steeper.

BACKGROUND OF THE INVENTION

The television industry is undergoing significant changes as a result of the transition from the current standard definition television (SDTV) to high definition television (HDTV). Much of this change is driven by the FCC requirement that all broadcasters in the United States must transmit all programming content as HDTV signals and must cease transmitting SDTV signals by the year 2006.

As a result, high definition televisions are becoming increasingly available in the marketplace, as are HDTV conversion systems that convert an HDTV signal to an SDTV image for display on a standard definition television.

Some of the driving forces behind the transition to HDTV are the possibility of a larger and clearer picture, the changed aspect ratio (similar to movie format) in some systems, and the decreased susceptibility of the digital signal to noise during transmission to the viewer. As screens grow larger, viewers expect increased resolution. However, for a number of years to come, HDTV sets must be able to receive and display television signals according to the existing SDTV standard (e.g., PAL, NTSC, SECAM) while broadcast facilities are making the transition to the new HDTV standard (ATSC). In the interim, it is highly desirable that an HDTV set be able to display an SDTV signal at increased resolution to create the subjective impression of a high definition television image.

In addition, from the broadcast side, techniques are needed which can up-convert existing standard definition (SD) materials into high definition (HD) format.

Unfortunately, the resolution of the video signal at the television receiver is limited by the quality of the original video signal (e.g., PAL, NTSC, SECAM) or the bandwidth of the transmission channel. Therefore, in order to increase the resolution of the SDTV signals for better perceptual quality, post processing the video signal in the receiver after demodulation becomes increasingly important.

Post processing techniques for improving the resolution of a video image involve expanding the original signal bandwidth to match HD signal format. One approach is to sharpen the edges or boundaries of objects in the video image, such as people, plants, buildings, furnishings, and the like. In order to sharpen edges, a number of edge detection techniques have been developed. These techniques may be grouped in four principal categories: gradient operators, compass operators, Laplace operators and stochastic gradient operators. The Laplace operator locates edges the most precisely. However, because of its sensitivity to noise, the Laplace operator sometimes detects too many false edges.

Additionally, some objects in a video image, such as background objects, are deliberately kept out of focus. Other objects, such as peoples faces, have smooth transients. The edges of these objects are called soft edges or smooth edges. To keep the naturalness of these objects the same as in the original picture, it is important that the edge enhancement techniques be capable of adapting to the local edge features.

Luminance transient improvement (LTI) is a conventional technique for sharpening a video image by steepening edge transitions, which thereby increases the original signal bandwidth. There are two general approaches to making an edge steeper. One technique increases pixel values on the high side of any edge and decreases pixel values on the other side of the edge, thereby making a gradual transition more abrupt. The other technique is to replace pixel values near the edge with pixel values from further away from the edge. In steepening an edge, the LTI algorithm creates additional high frequency components around the edges.

However, there are two major drawbacks for existing algorithms. First, due to discrete time sampling, the edge center does not necessarily fall on the pixel lattice. If uncertainty in the exact location of the edge becomes too large, jitter becomes visible after enhancement. Secondly, the over enhancement of soft edges may result in an unnatural looking image.

There is therefore a need in the art for systems and methods for improving the resolution of a video image. In particular, there is a need for improved systems and methods for sharpening edges in a video image without introducing additional artifacts. More particularly, the improved system should be able to locate an edge center at the subpixel level and should be able to adapt to the local edge features.

SUMMARY OF THE INVENTION

To address the above-discussed deficiencies of the prior art, it is a primary object of the present invention to provide an apparatus for sharpening an edge in a video image. In an advantageous embodiment of the present invention, the apparatus comprises: 1) a first circuit capable of determining a first luminance value of a first pixel associated with the first edge and a second luminance value of a second pixel associated with the first edge, wherein the first and second pixels are adjacent pixels; 2) a second circuit capable of determining a position of a first subpixel disposed between the first and second pixels, wherein the first subpixel position is disposed approximately at a center of the first edge; 3) a third circuit capable of increasing a luminance value of a second subpixel disposed on a first side of the first edge center; and 4) a fourth circuit capable of decreasing a luminance value of a third subpixel disposed on a second side of the first edge center opposite the first side.

According to one embodiment of the present invention, the second circuit determines the position of the first subpixel by calculating a first second-order derivative of luminance for the first pixel and the second pixel.

According to another embodiment of the present invention, the second circuit determines the position of the first subpixel by calculating a plurality of intermediate second-order derivatives of luminance at a plurality of subpixel positions disposed between the first and second pixels.

According to still another embodiment of the present invention, the second circuit calculates the plurality of intermediate second-order derivatives of luminance at the plurality of subpixel positions by using a linear interpolation of the first second-order derivative.

According to yet another embodiment of the present invention, the second circuit determines the position of the first subpixel by determining a selected one of the subpixel positions at which a corresponding one of the plurality of intermediate second-order derivatives of luminance has a minimum value.

According to a further embodiment of the present invention, the second circuit calculates the plurality of intermediate second-order derivatives of luminance at the plurality of subpixel positions by using a polynomial interpolation of the first second-order derivative of luminance.

According to a still further embodiment of the present invention, the apparatus further comprises a gain control circuit capable of adjusting a value of luminance associated with at least one of the second subpixel and the third subpixel according to a frequency of additional edges proximate the first edge.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments set forth in this patent document to describe the principles of the apparatus and method of the present invention are by way of illustration only and should not be construed in any way to limit the scope of the invention: Those skilled in the art will understand that the principles of the present invention may be implemented in any suitably arranged video processing system, including, without limitation, television receivers, television broadcast systems, personal computers (PCs) containing advanced video processing circuits and related video processing software, and the like. In the descriptions that follow, a video image sharpening apparatus according to the present invention is implemented in a television set for illustration purposes only.

Figure 1:
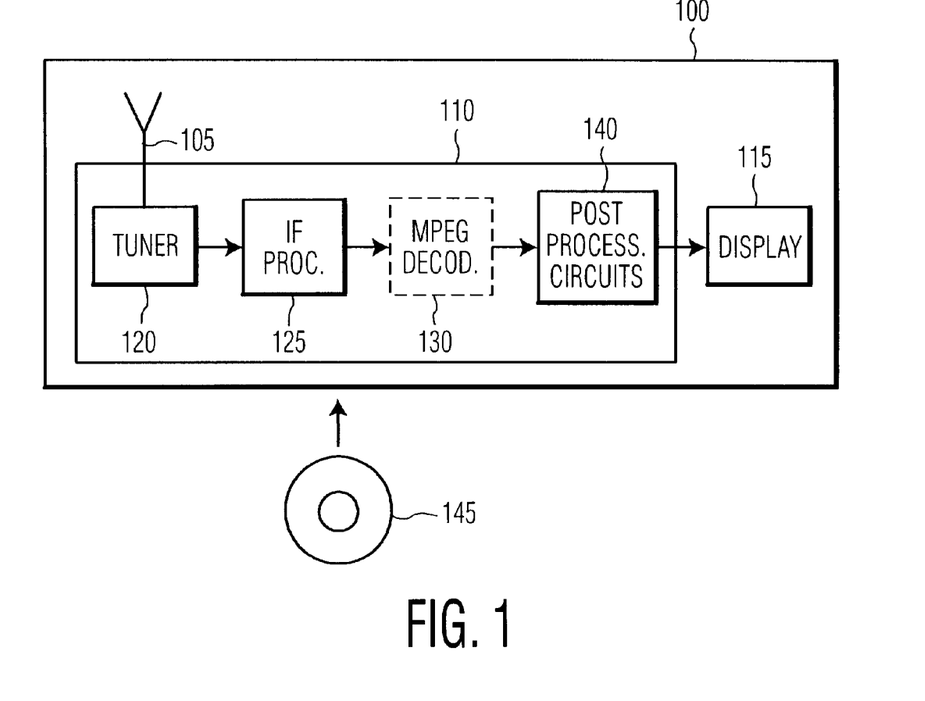
FIG. 1 is a block diagram of a television set that contains an apparatus for improving the sharpness of a video image according to principles of the present invention.

FIG. 1 is a block diagram of television set 100, which contains an apparatus for improving the sharpness of a video image according to principles of the present invention. Television set 100 comprises antenna 105, television receiver 110, and display unit 115. Antenna 105 receives incoming radio frequency (RF) television signals that are processed by television receiver 110. Display unit 115 may be, for example, a cathode ray tube, a flat panel display, or any other type of equipment for displaying video images.

Television receiver 110 comprises tuner 120, intermediate frequency (IF) processor 125, optional MPEG decoder 130, and post-processing circuitry 140. MPEG decoder 130 (shown in dotted lines) is optional in the exemplary embodiment because television receiver 110 may be an analog television receiver that does not contain an MPEG decoder. In such an embodiment, the output of IF processor 125 is used directly by post-processing circuitry 140. Tuner 120 down-converts the incoming RF signal to produce an intermediate frequency (IF) signal. The IF output of tuner 120 is further down-converted by IF processor 125 to produce a baseband signal that may be, for example a transport stream. MPEG decoder 130 may comprise a demultiplexer circuit that extracts from the transport stream at least one elementary stream, such as an MPEG-encoded data stream. MPEG decoder 130 then converts the encoded MPEG data stream and generates a standard video signal capable of being displayed by display unit 115. However, in order to further improve the quality of the video signal generated by MPEG decoder 130, the output of MPEG decoder 130 is transferred to post-processing circuitry 140 for additional processing. The improved video signal at the output of post-processing circuitry 140 is then transmitted to display unit 115.

Post-processing circuitry 140 is capable of carrying out several different types of video signal processing. Exemplary video signal processing functions performed by post-processing circuitry 140 may include: noise reduction algorithms, color correction, scaling, scan-rate conversion, adaptive feature enhancement, and other adaptive object based algorithms. In an advantageous embodiment, post-processing circuitry 140 further comprises image sharpening circuitry capable of performing noise level adaptive sharpness enhancement according to the principles of the present invention.

It was noted above that the present invention may be implemented in any suitably arranged video processing system, including personal computers containing advanced video processing circuits and related video processing software. This being the case, the present invention may be implemented as computer-executable instructions and data stored on the hard disk drive of a PC or on removable storage medium 145, which may be for example, a CD-ROM disk, a DVD disk, a 3.5 inch floppy disk, or the like. In an alternate advantageous embodiment of the present invention, removable storage medium 145 may be inserted into a disk drive attached to or embedded in television receiver 100. In such an embodiment, post-processing circuitry 140 is capable of downloading and storing the computer-executable instructions in an internal memory, such as a random access memory (RAM).

Figure 2:
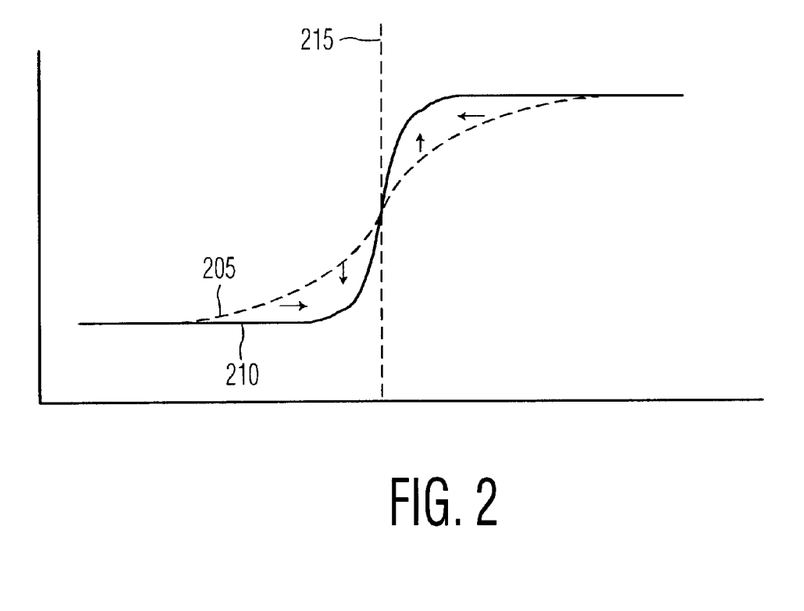
FIG. 2 illustrates the principles of the luminance transient improvement (LTI) algorithm according to one embodiment of the present invention.

Post-processing circuitry 140 enhances (or steepens) edge transitions by implementing a luminance transient improvement (LTI) algorithm according to the principles of the present invention. As noted above, two basic techniques are used to steepen an edge in a video image: 1) increasing or decreasing pixel values on either side of the edge center; and 2) replacing pixels close to the edge center with pixels away from the edge center. FIG. 2 illustrates the principles of the LTI algorithm. FIG. 2 depicts original pixel intensity curve 205, indicated by a dashed line, and enhanced (or steepened) pixel intensity curve 210, indicated by a solid line. The center of the edge is indicated by center line 215, indicated by a vertical dashed line.

The first technique for steepening an edge in a video image, namely increasing or decreasing pixel values on either side of the edge center, is indicated by the up and down directional arrows in FIG. 2. On the left side of center line 215, the down arrow indicates that the pixel values located to the left of center line 215 in original pixel intensity curve 205 are decreased to generate enhanced pixel intensity curve 210. On the right side of center line 215, the up arrow indicates that the pixel values located to the right of center line 215 in original pixel intensity curve 205 are increased to generate enhanced pixel intensity curve 210.

The second technique for steepening an edge in a video image, namely replacing pixels close to the edge center with pixels away from the edge center, is indicated by the left and right directional arrows in FIG. 2. On the left side of center line 215, the right arrow indicates that pixel values located to the left of center line 215 in original pixel intensity curve 205 are shifted rightward toward center line 215 to generate enhanced pixel intensity curve 210. On the right side of center line 215, the left arrow indicates that pixel values located to the right of center line 215 in original pixel intensity curve 205 are shifted leftward toward center line 215 to generate enhanced pixel intensity curve 210.

There are two drawbacks for the existing algorithms. First, due to the discrete time sampling, the edge center does not necessarily fall on the pixel lattice. If the uncertainty in the exact location becomes too large, jitter becomes visible after enhancement. Secondly, the over-enhancement of soft edges results in an "unnatural" image.

According to the principles of the present invention, the LTI algorithm implemented by post-processing circuitry 140 solves the problem of jitter caused by uncertainty in the location of an edge by locating the edge center with subpixel accuracy. Post-processing circuitry 140 solves the second problem by detecting soft edges in advance and adaptively controls the gain factor based on the edge frequency.

Figure 3:
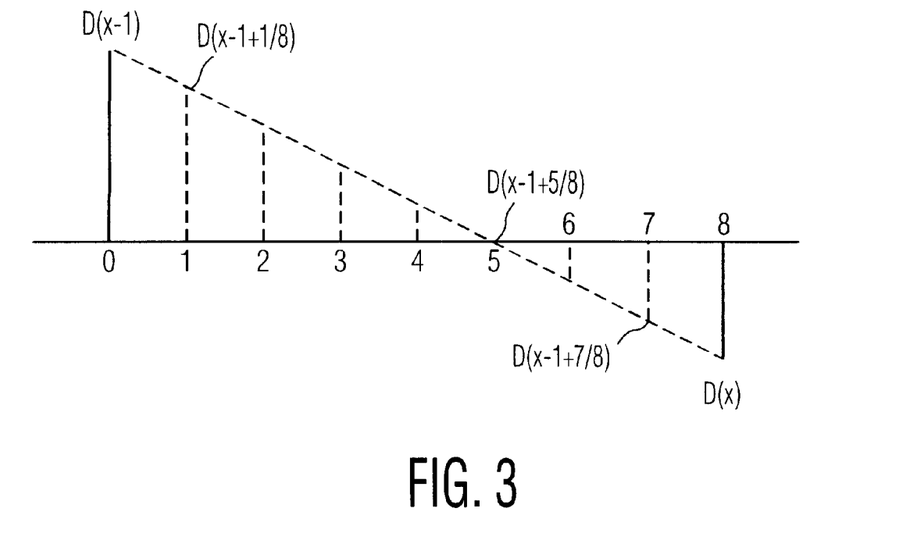
FIG. 3 illustrates a subpixel level edge center detection operation performed by the exemplary post processing circuitry according to one embodiment of the present invention.

Pixel level accuracy is not sufficient to produce high quality video. The LTI algorithm of the present invention locates the edge center with subpixel accuracy by linearly interpolating the second derivative between the two adjacent pixels which are the detected edge on the pixel level. The subpixel that has the minimum absolute value is regarded as the edge center. FIG. 3 illustrates a subpixel level edge center detection algorithm performed by post-processing circuitry 140 according to one embodiment of the present invention. In an exemplary embodiment of the present invention, post-processing circuitry 140 uses one-eighth of a pixel as a subpixel size.

Assume $L(x)$ is the luminance value at pixel x. The LTI algorithm is explained as follows:

1. First, post-processing circuitry 140 calculates the low-passed second order derivative for two neighboring pixels:

$$D(x) = -L(x-n) + 2*L(x) - L(x+n)$$

$$D(x-1) + -L(x-(n+1)) + 2*L(x-1) - L(x+(n-1))$$

The frequency characteristic of the low-passed second order derivative filter is controlled by the value of n. For the best performance, n should be local adaptive.

2. Second, post-processing circuitry 140 calculates the low-passed second order derivative on subpixel positions by linear interpolation:

$$D(x-1+n/N) = (1-n/N)*D(x-1) + n/N*D(x).$$

N=8 in the example (i.e., subpixel is one-eighth of a pixel).

3. Next, post-processing circuitry 140 locates the edge center by searching for the subpixel position, M, which has a second order derivative having the minimum absolute value:

$$D(x-1+m/N) = \min\{D(x-1+n/N), n=0, \ldots, N\}$$

M=5 in the example in FIG. 3. In an alternate embodiment of the present invention, post-processing circuitry 140 may calculate the second order derivatives on subpixel positions using interpolation based on polynomials. The resulting quality is about the same as the linear interpolation described above. However, the complexity of the circuitry in post-processing circuitry 140 increases dramatically.

It is assumed that all candidate edges for LTI improvement originally had similar sharpness. These are sharp edges in reality. The sharp edges are blurred due to limited transmission bandwidth, upscaling, or other reasons. The frequency of these edges is indicated by the ratio of the third order derivative and the first order derivative of the video signal.

Figure 4:
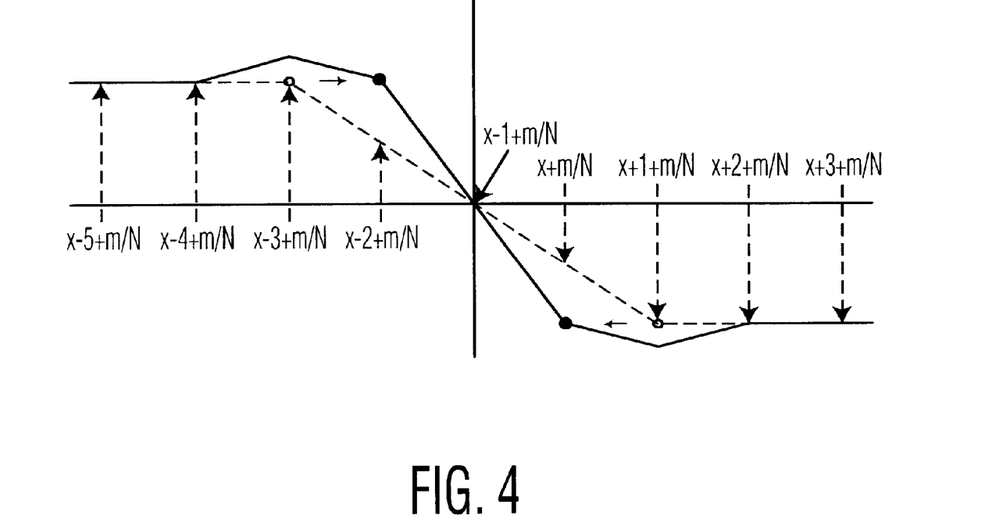
FIG. 4 illustrates an LTI operation performed by the exemplary post processing circuitry according to one embodiment of the present invention.

Once the original edge frequency and the desired high frequency are determined, post-processing circuitry 140 may calculate the amount of the pixel shift. FIG. 4 illustrates an LTI operation performed by exemplary post processing circuitry 140 according to one embodiment of the present invention. In this example, the original high frequency and desired high frequency are $\tfrac{1}{8} f_{SAMPLE}$ and $\tfrac{1}{4} f_{SAMPLE}$, respectively. Therefore, postprocessing circuitry 140 shifts pixels that originally are two pixels away from the edge center one pixel towards the edge center.

If ½$f_{SAMPLE}$ is desired, post-processing circuitry 140 shifts the original pixels one and a half pixels towards the edge center.

After detecting the edge center on the sub-pixel level, there are three steps for the sub-pixel level LTI:
1. Calculate signal value on the shifted sampling latices by using a linear interpolation filter.
2. Shift pixels on each side of the edge center towards the edge center on the shifted sampling lattices.
3. Calculate edge corrected signal values on the original sampling lattices by using the linear interpolation filter.

Since it is unlikely that the edge center coincides with the pixel position, the required neighboring pixels for the shifting process may not originate from the fixed pixel grid either. Therefore, in an exemplary embodiment of the present invention, post-processing circuitry 140 comprises a six-tap polyphase filter that performs linear interpolation of the video signals at the sib-pixel locations. However, the interpolation filter is not limited to the use of a six-tap polyphase filter. In other embodiments, the present invention may also be implemented using a four-tap polyphase filter or others.

In some LTI algorithms, the original values of the pixels are kept. However, according to an advantageous embodiment of the present invention, post-processing circuitry 140 calculates new pixel value values by applying an additional filter. One advantage of this is that post-processing circuitry 140 can combine this filter with additional peaking. If the edge center is not on a pixel lattice, the final step of the LTI algorithm according to present invention is to calculate the pixel values on the original pixel lattice. Once again, this may be done by using a six tap polyphase filter, but is not limited to this kind of filter.

Figure 6:
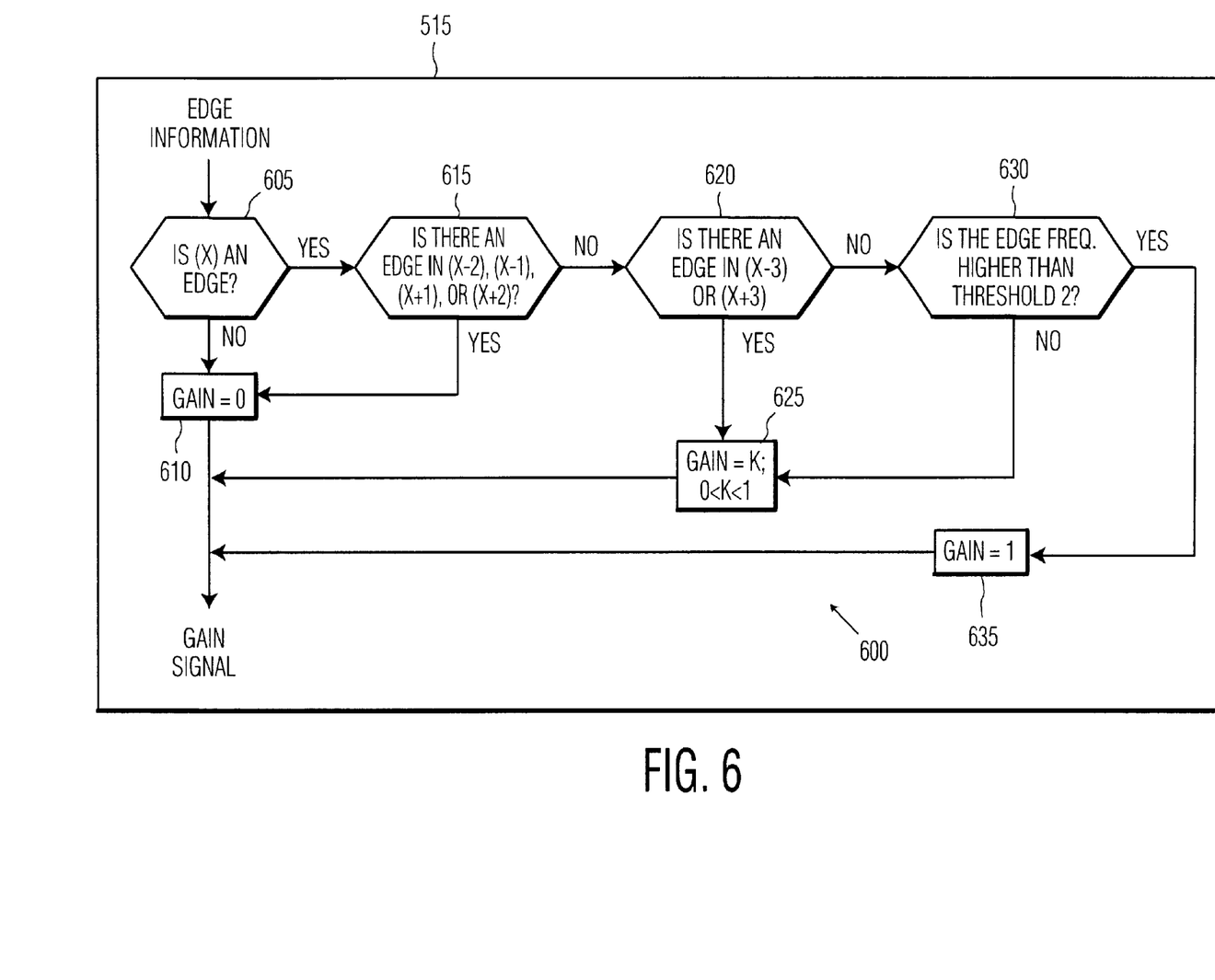
FIG. 6 is a flow diagram illustrating the operation of the exemplary gain controller in FIG. 5 according to one embodiment of the present invention.

In an advantageous embodiment of the present invention, the gain control unit executes the algorithm shown in FIG. 6 to prevent picture artifacts. One type of LIT artifact is caused by the "over-the-hill problem." It occurs when pixels of another edge are shifted. In an advantageous embodiment of the present invention, post-processing circuitry 140 eliminates the over-the-hill problem by controlling the gain in pixel shifting when there is another edge in the close neighboring pixels. Accordingly, post-processing circuitry 140 performs partial edge enhancement when the distance to the neighboring edge is three pixels, no edge enhancement when the distance is less than three pixels, and full edge enhancement when the distance is large r than three pixels.

To increase the quality performance on various types of edges, post-processing circuitry 140 uses two thresholds on the edge frequency. Detected edges are classified into three groups: soft edges, semi-soft edges and edges. For semi-soft edges, post-processing circuitry 140 performs a partial LTI algorithm. The threshold for identifying soft edges is fixed. The threshold for semi-soft edges can be set as fixed or calculated from the input video content. However, the classification of detect edges is not limited to only three classes. The number of classes is determined by the complexity of the processing and the expected quality.

The three steps described above show the basic principles of sub-pixel LTI. However, in many consumer products, it may be too complex to go through these steps for every edge. In an advantageous embodiment, the present invention may be implemented using a look-up table (LUT) to calculate the amount of the updating caused by the LTI. The LUT stores groups of position-varied FIR coefficients. A group of FIR coefficients is selected according to the detected sub-pixel position.

Figure 5:
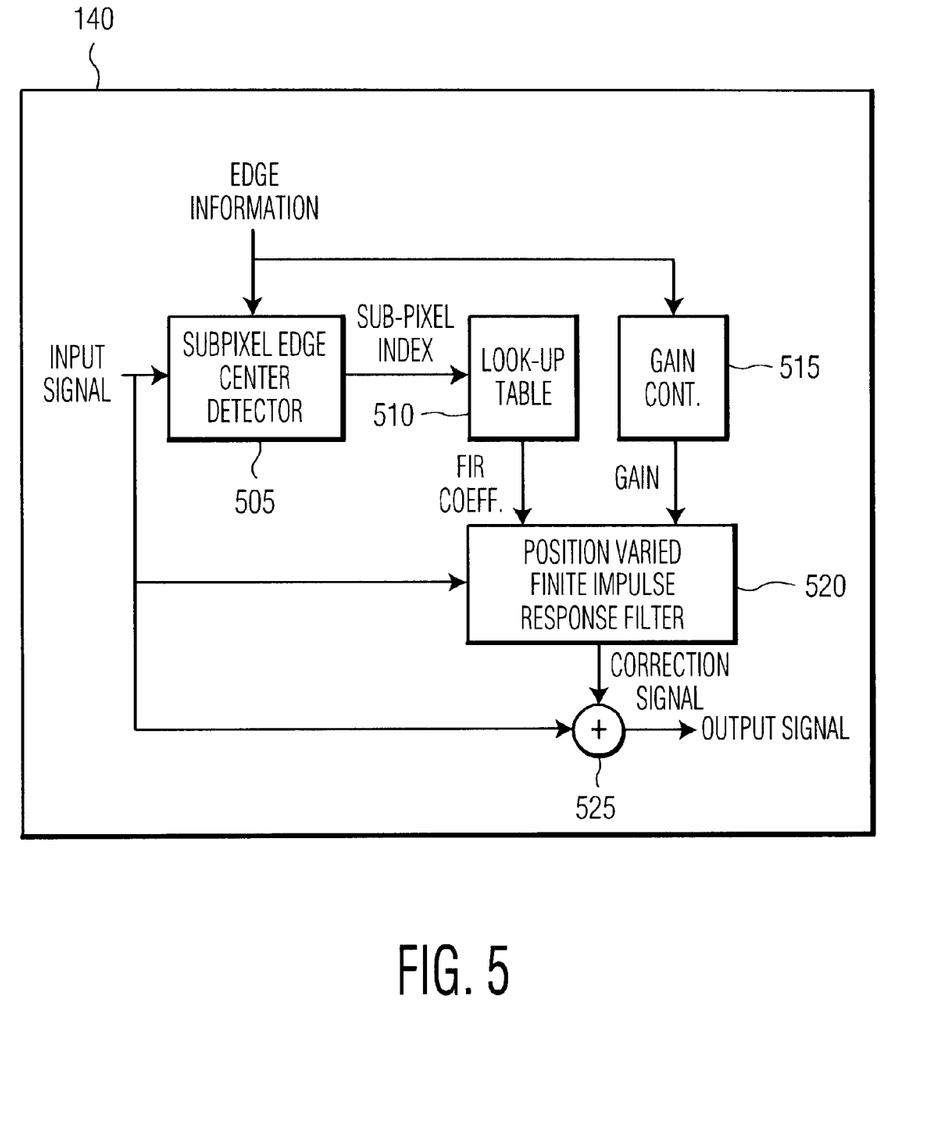
FIG. 5 is a block diagram of selected portions of the post processing circuitry according to one embodiment of the present invention.

FIG. 5 is a block diagram of selected portions of post-processing circuitry 140 according to an exemplary embodiment of the present invention. Post-processing circuitry 140 comprises sub-pixel edge center detector 505, look-up table 510, gain controller 515, position varied finite impulse response (FIR) filter 520, and adder 525. Sub-pixel edge center detector 505 receives the original video input signal and edge information from a previous stage identifying the location of an edge at the pixel level. Sub-pixel edge center detector 505 then identifies the location of the edge center at the sub-pixel level according to the algorithm described above in FIG. 3. LUT 510 receives the sub-pixel index information identifying the location of the edge center and outputs a selected one of the position-varied FIR coefficients stored in LUT 510, according to the detected sub-pixel position.

Gain controller 515 also receives the edge information identifying the location of an edge at the pixel level and generates a gain factor according to the algorithm described in FIG. 6. Position varied FIR filter 520 receives the original video input signal, the FIR coefficients generated by LUT 510, and the gain factor generated by gain controller 515, and generates therefrom a correction signal that sharpens a detected edge at the subpixel level. Adder 525 receives the original video input signal and the correction signal from position varied FIR filter 520 and generates the final video output signal in which the edges have been sharpened.

FIG. 6 is a flow diagram illustrating the operation of the exemplary gain controller 515 according to one embodiment of the present invention. Gain controller 515 receives edge information identifying whether a selected pixel [X] being processed occurs on an edge. If pixel [X] is not an edge pixel, then gain controller 515 sets the gain factor to zero, so that no correction signal is applied by position varied FIR filter 520 (process steps 605 and 610). If pixel [X] is an edge pixel, the gain controller 515 determines if there is an edge pixel in the two preceding or two following pixels (i.e., [X−2], [X−1], [X+1], and [X+2]). If there is an edge pixel located in [X−2], [X−1], [X+1], or [X+2], then gain controller 515 sets the gain factor to zero, so that no correction signal is applied by position varied FIR filter 520 (process steps 615 and 610).

If there is no edge pixel located in [X−2], [X−1], [X+1], or [X+2], then gain controller 515 determines if there is an edge pixel located at pixel [X−3] or pixel [X+3]. If there is an edge pixel located at [X−3] or [X+3], then gain controller 515 sets the gain factor, K, to some value between zero and one (i.e., 0<K<1) (process steps 620 and 625). If there is no edge pixel located at either [X−3] or [X+3], then gain controller 515 determines whether the edge frequency is higher that some predetermined threshold. If the edge frequency is not higher than the predetermined threshold, then gain controller 515 again sets the gain factor, K, to some value between zero and one (i.e., 0<K<1) (process steps 630 and 625). If the edge frequency is higher than the predetermined threshold, then gain controller 515 again sets the gain factor, K, equal to one (i.e., K=1) (process steps 630 and 635).

Figure 7:
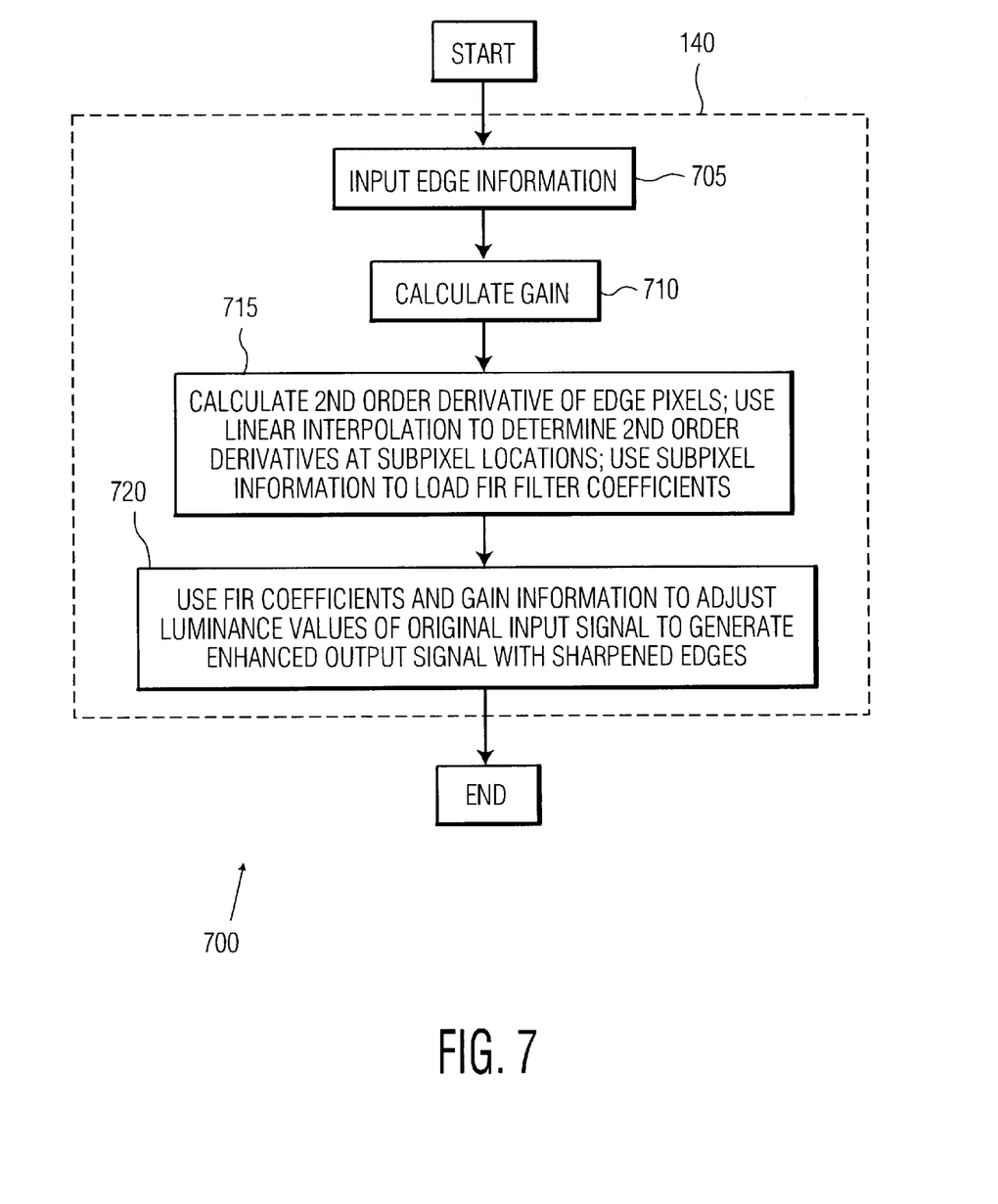
FIG. 7 is a flow diagram illustrating the operation of the selected portions of post processing circuitry according to one embodiment of the present invention.

FIG. 7 depicts flow diagram 700, which illustrates the overall operation of the selected portions of post-processing circuitry 140 in FIG. 4 according to one embodiment of the present invention. Post-processing circuitry 140 receives the original input video signal and edge information identifying the location of an edge at the pixel level (process step 705). The location of the edge at the pixel level may be determined by any one of a number of conventional algorithms. Next, post-processing circuitry 140 calculates a gain factor that is applied to the sub-pixel values around the edge center (process step 710). Next, post-processing circuitry 140 calculates the second order derivative of the edge pixels and uses linear interpolation to determine the second order derivative at the sub-pixel level. The sub-pixel level information is used to select the FIR filter coefficients (process step 715). Finally, post-processing circuitry 140 uses the FIR coefficients and the gain control signal to adjust the luminance values of the original input signal, thereby generating an enhanced output signal having sharpened edges (process step 720).

Although the present invention has been described in detail, those skilled in the art should understand that they can make various changes, substitutions and alterations herein without departing from the spirit and scope of the invention in its broadest form.

What is claimed is:

1. An apparatus for sharpening a first edge in a video image comprising:
    a first circuit capable of determining a first luminance value of a first pixel associated with said first edge and a second luminance value of a second pixel associated with said first edge, wherein said first and second pixels are adjacent pixels;
    a second circuit capable of determining a position of a first subpixel disposed between said first and second pixels, wherein said first subpixel position is disposed approximately at a center of said first edge;
    a third circuit capable of increasing a luminance value of a second subpixel disposed on a first side of said first edge center; and
    a fourth circuit capable of decreasing a luminance value of a third subpixel disposed on a second side of said first edge center opposite said first side, wherein said second circuit determines said position of said first subpixel by calculating a plurality of intermediate second-order derivatives of luminance at a plurality of subpixel positions disposed between said first and second pixels.

2. The apparatus as set forth in claim 1 wherein said second A circuit calculates said plurality of intermediate second-order derivatives of luminance at said plurality of subpixel positions by using a linear interpolation of said first second-order derivative.

3. The apparatus as set forth in claim 2 wherein said second circuit determines said position of said first subpixel by determining a selected one of said subpixel positions at which a corresponding one of said plurality of intermediate second-order derivatives of luminance has a minimum value.

4. The apparatus as set forth in claim 1 wherein said second circuit calculates said plurality of intermediate second-order derivatives of luminance at said plurality of subpixel positions by using a polynomial interpolation of said first second-order derivative of luminance.

5. The apparatus as set forth in claim 4 wherein said second circuit determines said position of said first subpixel by determining a selected one of said subpixel positions at which a corresponding one of said plurality of intermediate second-order derivatives of luminance has a minimum value.

6. The apparatus as set forth in claim 1 wherein said apparatus further comprises a gain control circuit capable of adjusting a value of luminance associated with at least one of said second subpixel and said third subpixel according to a frequency of additional edges proximate said first edge.

7. A television receiver comprising:
    demodulation circuitry capable of receiving an incoming RF television signal and generating therefrom a baseband video signal capable of being displayed as a plurality of pixels on a video display; and
    post processing circuitry, coupled to an output of said demodulation circuitry and receiving therefrom said baseband video signal, capable of sharpening a first edge in a video image formed by said plurality of pixels, said post processing circuitry comprising:
        a first circuit capable of determining a first luminance value of a first pixel associated with said first edge and a second luminance value of a second pixel associated with said first edge, wherein said first and second pixels are adjacent pixels;
        a second circuit capable of determining a position of a first subpixel disposed between said first and second pixels, wherein said first subpixel position is disposed approximately at a center of said first edge;
        a third circuit capable of increasing a luminance value of a second subpixel disposed on a first side of said first edge center; and
        a fourth circuit capable of decreasing a luminance value of a third subpixel disposed on a second side of said first edge center opposite said first side, wherein said second circuit determines said position of said first subpixel by calculating a plurality of intermediate second-order derivatives of luminance at a plurality of subpixel positions disposed between said first and second pixels.

8. The television receiver as set forth in claim 7 wherein said second circuit calculates said plurality of intermediate second-order derivatives of luminance at said plurality of subpixel positions by using a linear interpolation of said first second-order derivative.

9. The television receiver as set forth in claim 8 wherein said second circuit determines said position of said first subpixel by determining a selected one of said subpixel positions at which a corresponding one of said plurality of intermediate second-order derivatives of luminance has a minimum value.

10. The television receiver as set forth in claim 7 wherein said second circuit calculates said plurality of intermediate second-order derivatives of luminance at said plurality of subpixel positions by using a polynomial interpolation of said first second-order derivative of luminance.

11. The television receiver as set forth in claim 10 wherein said second circuit determines said position of said first subpixel by determining a selected one of said subpixel positions at which a corresponding one of said plurality of intermediate second-order derivatives of luminance has a minimum value.

12. The television receiver as set forth in claim 7 wherein said apparatus further comprises a gain control circuit capable of adjusting a value of luminance associated with at least one of said second subpixel and said third subpixel according to a frequency of additional edges proximate said first edge.

13. A method of sharpening a first edge in a video image comprising the steps of:
    determining a first luminance value of a first pixel associated with the first edge and a second luminance value of a second pixel associated with the first edge, wherein the first and second pixels are adjacent pixels;
    determining a position of a first subpixel disposed between the first and second pixels, wherein the first subpixel position is disposed approximately at a center of the first edge;
    increasing a luminance value of a second subpixel disposed on a first side of the first edge center; and decreasing a luminance value of a third subpixel disposed on a second side of the first edge center opposite said first side, wherein the step of determining the position of the first subpixel comprises the substep of calculating a plurality of intermediate second-order derivatives of luminance at a plurality of subpixel positions disposed between the first and second pixels.

14. The method as set forth in claim 13 wherein the step of calculating the plurality of intermediate second-order derivatives of luminance at the plurality of subpixel positions comprises the substep of linearly interpolating the first second-order derivative of luminance at the plurality of subpixel positions.

15. The method as set forth in claim 14 wherein the step of determining the position of the first subpixel comprises the substep of determining a selected one of the subpixel positions at which a corresponding one of the plurality of intermediate second-order derivatives of luminance has a minimum value.

16. The method as set forth in claim 13 wherein the step of calculating the plurality of intermediate second-order derivatives of luminance at the plurality of subpixel positions comprises the substep of using a polynomial interpolation of the first second-order derivative of luminance at the plurality of subpixel positions.

17. The method as set forth in claim 16 wherein the step of determining the position of the first subpixel comprises the substep of determining a selected one of the subpixel positions at which a corresponding one of the plurality of intermediate second-order derivatives of luminance has a minimum value.

18. The method as set forth in claim 13 further comprising the step of adjusting a value of luminance associated with at least one of the second subpixel and the third subpixel according to a frequency of additional edges proximate the first edge.

19. Computer-executable instructions stored on a computer-readable storage medium and capable of sharpening an edge in a video image, the computer-executable instructions comprising the steps of:

determining a first luminance value of a first pixel associated with the first edge and a second luminance value of a second pixel associated with the first edge, wherein the first and second pixels are adjacent pixels;

determining a position of a first subpixel disposed between the first and second pixels, wherein the first subpixel position is disposed approximately at a center of the first edge;

increasing a luminance value of a second subpixel disposed on a first side of the first edge center; and decreasing a luminance value of a third subpixel disposed on a second side of the first edge center opposite said first side, wherein the step of determining the position of the first subpixel comprises the substep of calculating a plurality of intermediate second-order derivatives of luminance at a plurality, of subpixel positions disposed between the first and second pixels.

20. The computer-executable instructions stored on a computer-readable storage medium as set forth in claim 19 wherein the step of calculating the plurality of intermediate second-order derivatives of luminance at the plurality of subpixel positions comprises the substep of linearly interpolating the first second-order derivative of luminance at the plurality of subpixel positions.

21. The computer-executable instructions stored on a computer-readable storage medium as set forth in claim 20 wherein the step of determining the position of the first subpixel comprises the substep of determining a selected one of the subpixel positions at which a corresponding one of the plurality of intermediate second-order derivatives of luminance has a minimum value.

22. The computer-executable instructions stored on a computer-readable storage medium as set forth in claim 20 wherein the step of calculating the plurality of intermediate second-order derivatives of luminance at the plurality of subpixel positions comprises the substep of using a polynomial interpolation of the first second-order derivative of luminance at the plurality of subpixel positions.

23. The computer-executable instructions stored on a computer-readable storage medium as set forth in claim 22 wherein the step of determining the position of the first subpixel comprises the substep of determining a selected one of the subpixel positions at which a corresponding one of the plurality of intermediate second-order derivatives of luminance has a minimum value.

24. The computer-executable instructions stored on a computer-readable storage medium as set forth in claim 22 further comprising the step of adjusting a value of luminance associated with at least one of the second subpixel and the third subpixel according to a frequency of additional edges proximate the first edge.

* * * * *